April 19, 1960

C. A. CAMPBELL 2,933,364

HIGH SPEED RECORDING SYSTEM

Filed April 27, 1956

INVENTOR.
Charles A. Campbell

BY Hyman Hurvitz
Attorney

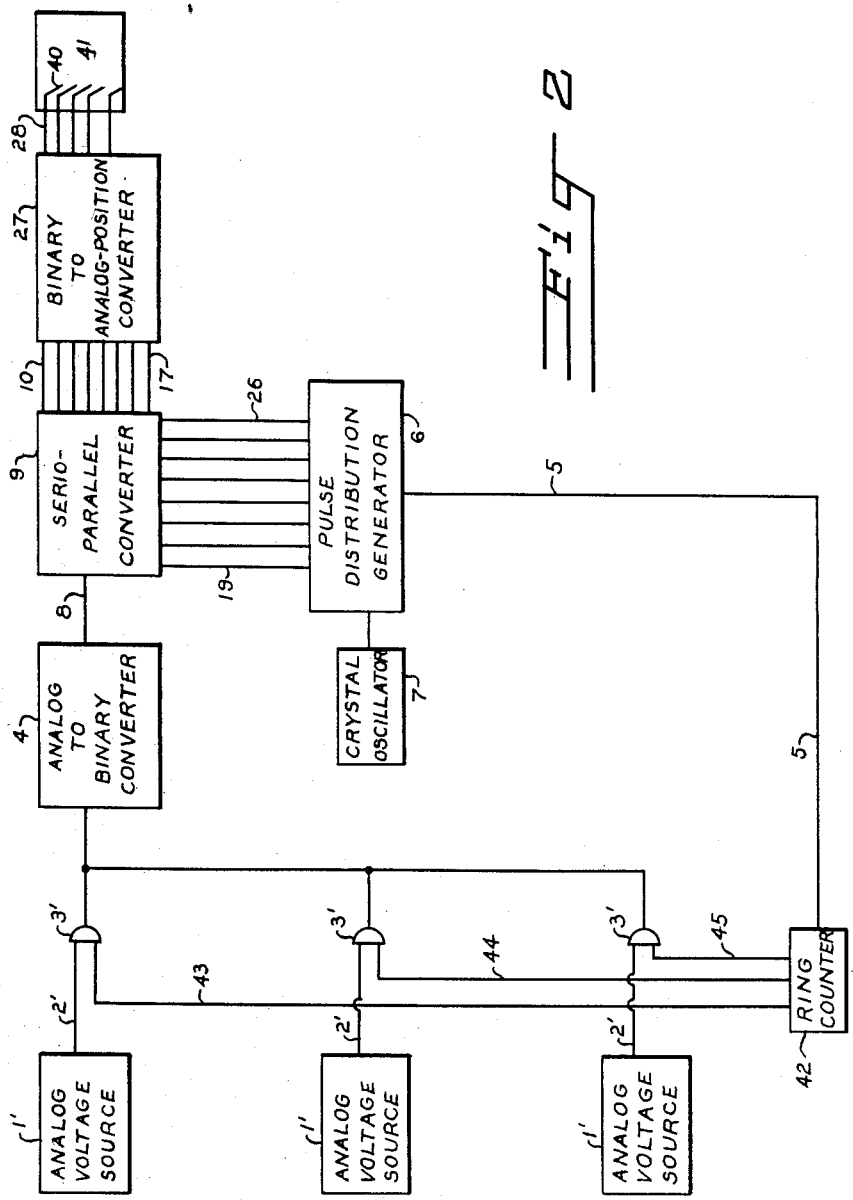

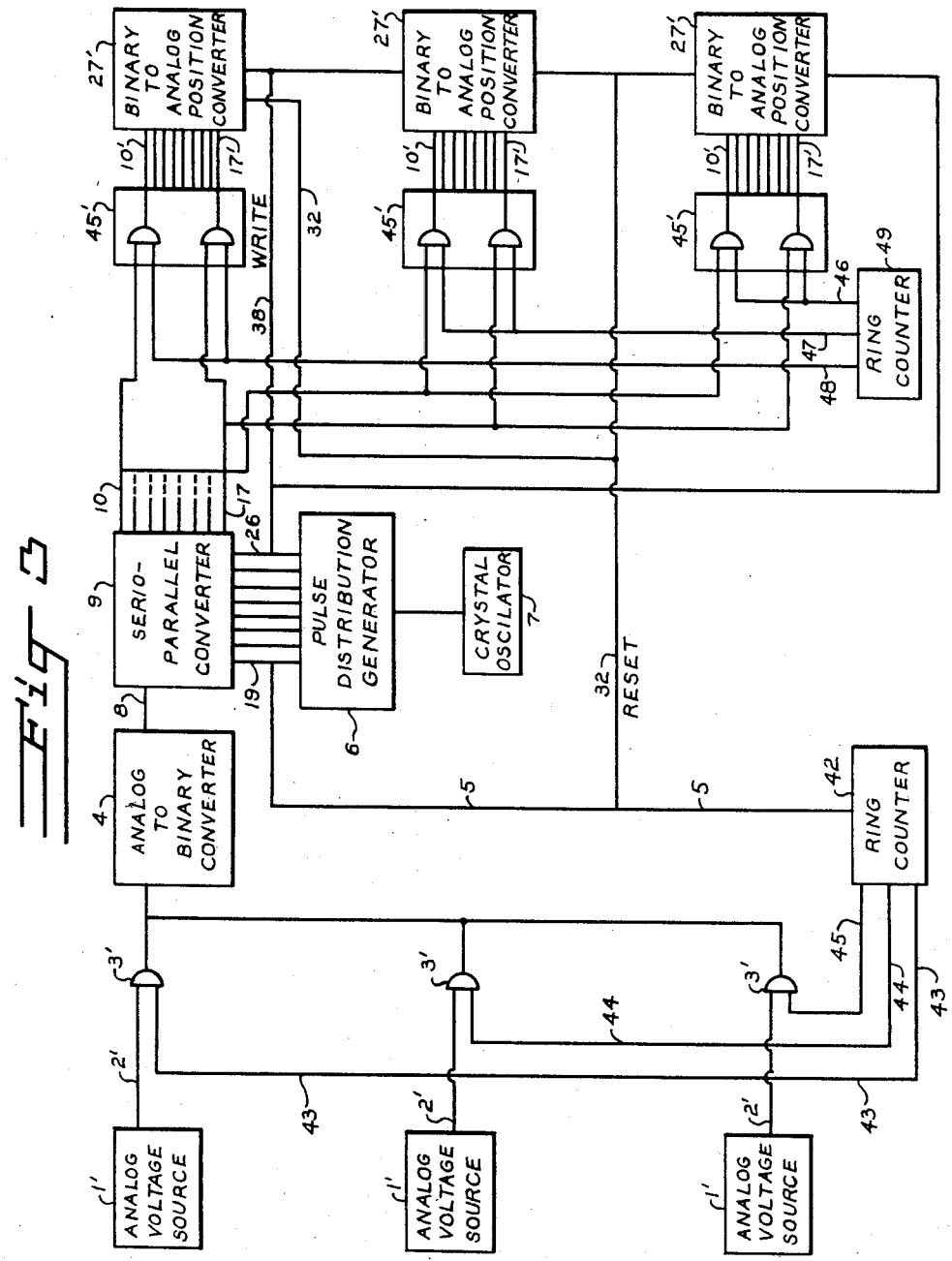

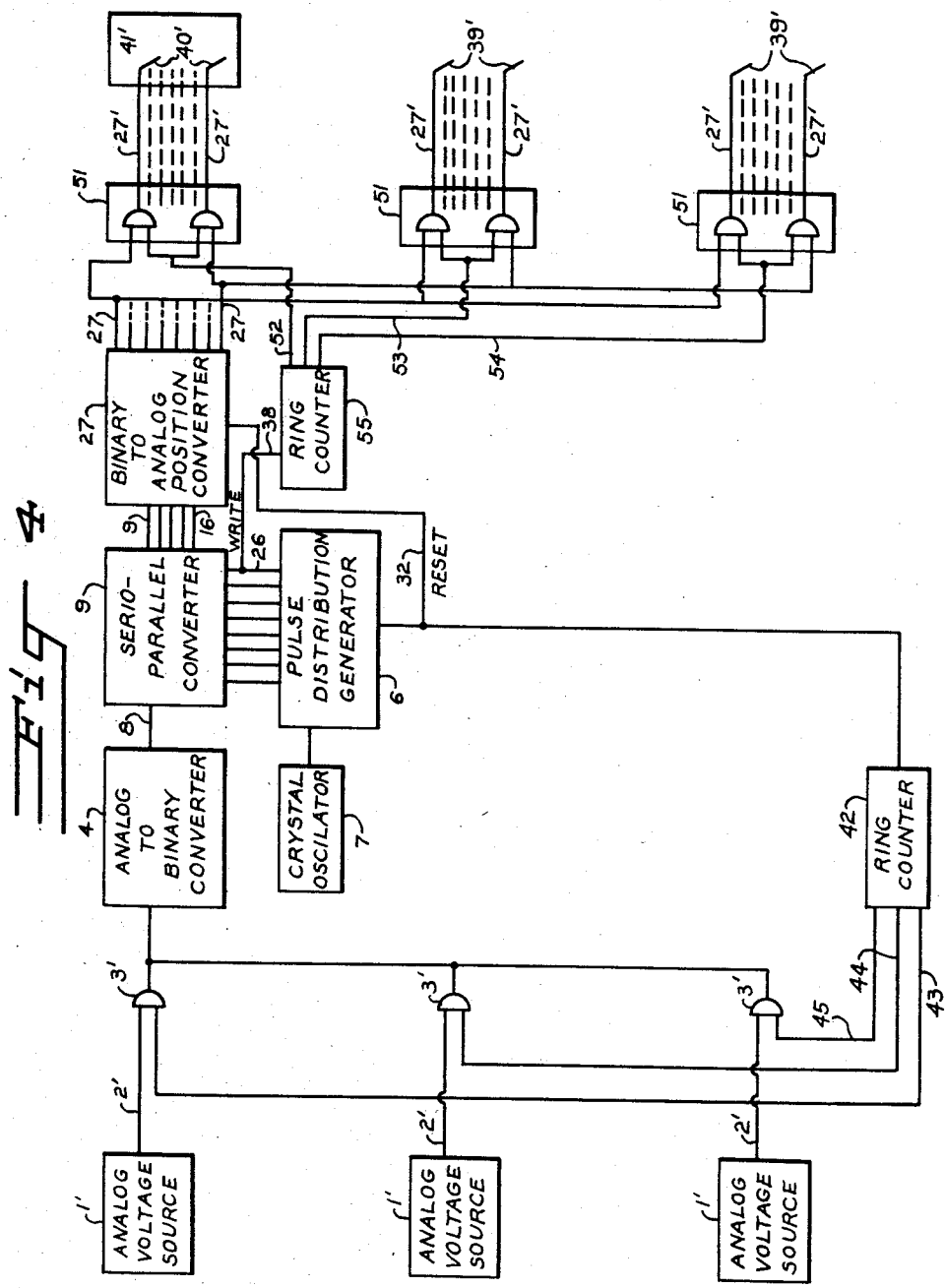

United States Patent Office 2,933,364
Patented Apr. 19, 1960

2,933,364

HIGH SPEED RECORDING SYSTEM

Charles A. Campbell, Melbourne, Fla.

Application April 27, 1956, Serial No. 581,142

11 Claims. (Cl. 346—33)

The present invention relates to analog voltage recording systems and more particularly to a high speed analog voltage recording system utilizing analog-to-binary-to-analog position conversion for obtaining an accurate and rapid graphical representation of an analog voltage.

In conventional analog recording systems an analog voltage is applied to an amplitude responsive recording mechanism which traces a graph on a chart indicative of instantaneous amplitudes of the analog voltage. Several tracing systems of this type are well known in the art, including those which employ galvanometer-deflected mirrors for recording on photographic paper, or which provide ink lines made by a motor-driven pen, or movable electric stylus tracings on electro-sensitive paper. All of these systems depend upon the physical movement of an inertial recording element and are inherently inaccurate since the inertia of the movable element causes it to overshoot or undershoot and introduces frequency, phase and amplitude distortions. The inertia of the movable elements severely limits the frequency response of the systems and prevent their utilization in recording high frequency and transient voltages. Additional inaccuracies and inconveniences are experienced with conventional analog recording systems as a result of difficulty in accurately reading the amplitude of a conventional analog recording to better than 1% of its actual value. Further inaccuracies are introduced into the prior art systems as a result of the sensitivity of the moving mechanical or optical writing components to shock, acceleration and vibration. In spite of the difficulties encountered in producing accurate analog recordings it is desirable to maintain the analog form of record inasmuch as it provides a true representation of the event being recorded. The true representation provided by the analog type of recording system is easily read and affords a final record corresponding with the mental picture an investigator usually has of the events taking place.

It is therefore an object of the present invention to provide a high speed recording system which produces a true analog representation of an event to be recorded and which is not subject to inaccuracies and frequency response limitations resulting from the inertia of mechanical components.

Another object of the present invention is to provide an analog recording system having no moving parts.

It is yet another object of the present invention to provide an analog recording system employing a plurality of fixed recording members and employing digital techniques for selecting the single recording member which is arranged to produce an indication indicative of the value to be recorded.

It is another object of the present invention to provide a high speed and highly accurate analog recording system which combines the accuracy of reproduction and readout of a digital recording system with a true analog representation of an event under investigation.

It is another object of the present invention to provide a high speed recording system wherein an analog voltage to be recorded is converted to a pulse code representation of the voltage, which representation is thereafter converted, by digital computer techniques, to an analog position voltage. The term "analog position voltage" as hereinafter employed in the present description refers to a unitary voltage or voltage pulse applied selectively to one of a plurality of leads, the position of each lead with respect to the other leads being determinative of the value represented by the voltage pulse appearing thereon and being proportional to the pulse code representation which effected the application of a voltage to that particular lead.

It is another object of the present invention to provide a high speed analog recording system utilizing a plurality of record medium marking members wherein only one marking member is energized at a time to produce a mark on the record medium and wherein the position of the energized marking member with respect to the position of the other marking members, is indicative of the instantaneous amplitude of the analog voltage to be recorded.

It is another object of the present invention to convert an analog voltage to be recorded to a pulse code representation thereof, thereafter to convert the pulse code representation to an analog position voltage, and to apply the analog position voltage to the one of a plurality of record medium marking members which provides a mark on the record medium having a position indicative of the amplitude of the voltage to be recorded.

It is yet another object of the present invention to provide a high speed recording system for producing an analog record wherein the record is composed of a plurality of distinct marks each indicative of a precise value.

It is another object of the present invention sequentially and successively to sample a plurality of analog voltage sources and sequentially and successively to select one of a plurality of groups of record medium marking member in synchronism with the sampling, and applying an analog position voltage to the selected marking members indicative of the sampled voltage.

The above and still further features, objects, and advantages of the invention will become apparent upon consideration of the following detailed description of a specific embodiment of the invention, especially when taken in conjunction with the accompanying drawings, wherein:

Figure 2 is a schematic block diagram of a recording system for sequentially and successively sensing a plurality of analog voltage sources and for recording three distinct records on a single record medium;

Figure 1:
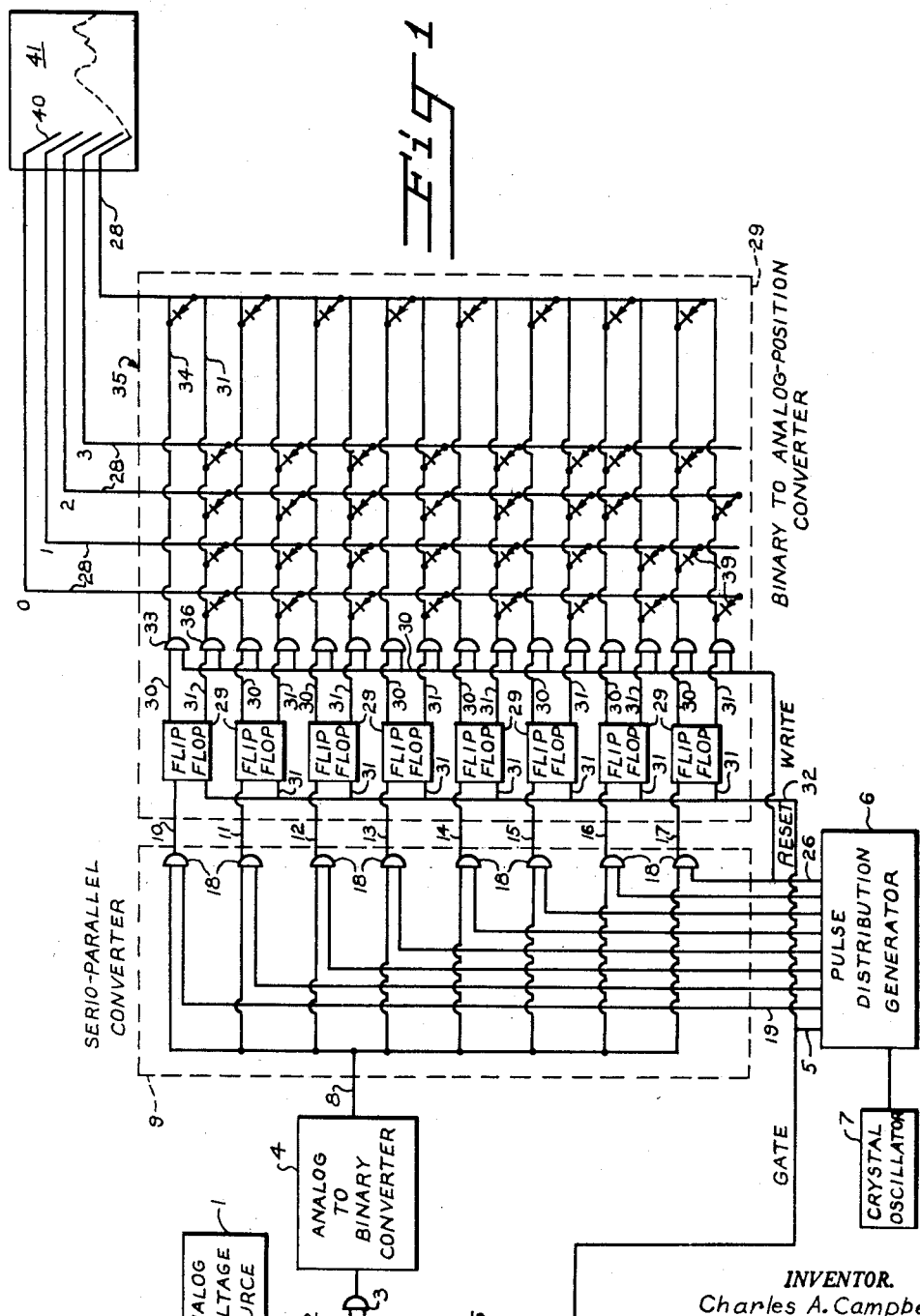
Figure 1 is a schematic wiring diagram of a single channel recording system of the present invention.

Figure 3 is a schematic block diagram of a recording system for sequentially and successively sensing a plurality of analog voltage sources and for recording the indications for each source on a distinct record member; and Figure 4 is a schematic block diagram of a preferred embodiment of a recording system for sequentially and successively sensing a plurality of analog voltage sources and for recording the indications for each source of a distinct record member.

Referring to Figure 1 of the accompanying drawings, a source 1 of analog voltage to be recorded is coupled via a lead 2 to a coincidence gate 3 and through the gate 3 to an analog-to-binary converter 4. The voltages appearing on the lead 2 are gated through the gate 3 by gating voltage pulses appearing on a lead 5 constituting a second input lead to the gate 3. Voltage pulses are developed on a lead 5 by a pulse distribution generator 6 comprising a conventional nine stage ring counter, the lead 5 being connected to receive pulses from the first stage thereof. The counter is stepped by a crystal oscillator 7, the frequency of oscillation of which is determined by the frequency range of the amplitude variations of the analog voltage it is desired to record and, for the purposes of explanation, the oscillator is assumed to oscillate at 216 kilocycles/sec. Since the pulse distribution generator 6 employs a nine-stage ring counter, a gating pulse appears on the lead 5 during each ninth cycle of oscillation of the oscillator 7, and therefore, voltage information on the lead 2 is gated at a 24 kilocycle/sec. rate to the converter 4. The analog-to-binary converter 4 converts the analog voltage to a serial binary code having a predetermined number of voltage pulses per code, the first pulse, in time, representing the most significant digit and subsequent pulses representing digits of decreasing significance. The number of pulses per binary code representation determines the accuracy of the code representation and for the purposes of illustration an eight pulse code is utilized which provides a conversion accuracy of ±0.2%. The converter 4 is a conventional circuit element and may be of the type disclosed in U.S. Patent No. 2,569,927 to Gloess et al. or of the type discussed in the article "Coding by Feedback Methods," by B. D. Smith, Proceedings of the IRE, volume 41, August 1953, pp. 1,053 to 1,058. Although the present invention is described as employing a binary pulse code, it is not intended to limit the invention to a particular code, other code systems being equally applicable for use in the invention.

The binary pulse code generated by the analog-to-binary converter 4 is applied via lead 8 to a serio-parallel converter 9. The serio-parallel converter 9 is utilized to distribute the eight time-displaced pulses of the binary code each to a distinct lead of a plurality of leads 10—17, such that the pulse in the first time position appears on the lead 10, the pulse in the second time position appears on the lead 11 and so on, with the pulse in the last or eighth time position appearing on the lead 17. The serio-parallel converter 9 utilizes eight coincidence gates 18, the binary coded pulses appearing on the lead 8 being applied in parallel to the gates 18. Gating voltage pulses to each of the gates 18 are applied respectively over leads 19 through 26, the leads 19—26 receiving voltage pulses, respectively, from the second through ninth stages of the ring counter in the pulse distribution generator 6. Consequently, voltage pulses are applied sequentially and successively to the leads 19 through 26 at a 216 kilocycle per second rate, and the binary coded pulses appearing on the lead 8 are gated sequentially and successively through the gates 18 to the leads 10 through 17, respectively. A pulse appears on the lead 19 approximately 4½ microseconds after a pulse appears on the lead 5 and this delay in the initial gating voltage applied to the serio-parallel converter 9 should allow sufficient time for the analog-to-binary converter 4 to apply the first pulse of the code to the lead 8. In the event that the converter 4 requires more time to produce the first pulse, appropriate and equal time delays may be inserted in the leads 19 through 26. If less than 4½ microseconds is required for the converter 4 to apply the first pulse to the lead 8, an appropriate delay line may be inserted in the lead 5 to synchronize the pulses appearing on lead 8 with the gating pulses appearing on the leads 19 through 26. The time distributed binary code pulses appearing on the leads 10 through 17 are applied to a binary-to-analog position converter 27 which decodes the binary coded pulses and selects one of 256 leads 28 (only five of which are illustrated) in accordance with the pulse code received over leads 10 through 17. The binary-to-analog position converter 27 includes eight flip-flops 29 and a diode matrix 35. Each flip-flop 29 is connected to receive a voltage pulse from a different one of the leads 10 through 17 and is provided with two output leads 30 and 31, making a total of 16 output leads. The flip-flops 29 are bistable elements utilized to accumulate the time displaced pulses on leads 10—17 so that they may be applied concurrently to the diode matrix 35. In a first state of conduction, hereinafter designated the A state, the flip-flops 29 apply a voltage to their associated leads 31 and in a second state of conduction, hereinafter referred to as the B state, each flip-flop 29 applies a voltage to its associated lead 30. Initially, all of the flip-flops are in the A state of conduction, and are individually flipped to the B state of conduction upon the generation of a voltage pulse on its associated lead of the group of leads 10 through 17. An additional control pulse developed on a lead 32 is applied in parallel, to all of the flip-flops 29, the lead 32 being connected to the lead 5 to receive a voltage pulse at the beginning of each cycle of the pulse distribution generator 6. The pulses appearing on the leads 32 reset all of the flip-flops 29 to the A state of conduction at the beginning of each recording interval; that is, at the instant that the information appearing on the lead 2 is gated to the analog-to-binary converter 4 through the coincidence gate 3. Adequate time delay is provided through the analog-to-binary converter 4 and serio-parallel converter 9 to allow the flip-flops 29 to be reset to the A state of conduction prior to the appearance of pulse coded voltages on the leads 10 through 17.

Each of the output leads 30 is connected through a different coincidence gate 33 to a distinct lead 34 of the diode matrix 35 and each of the leads 31 is connected through a different coincidence gate 36 to a distinct lead 37 of the diode matrix 35. The coincidence gates 33 and 36 are connected in parallel to receive gating voltages applied to a lead 38 from the lead 26, the lead 26 being connected to receive pulses from the last stage of the ring counter in the pulse distribution generator 6. The coincidence gates 33 and 36 prevent pulses from appearing on the leads 34 and 37 until all pulses of the code have been applied to the flip-flops 29. The pulses appearing on the leads 10 through 17 are displaced in time, each with respect to its adjacent pulse, by one cycle of the crystal oscillator 7, and the condition of the flip-flops 29 at any instant intermediate the interval required for the application of all pulses to leads 10 through 17 has no relationship to the analog voltage appearing on the lead 2. The flip-flops 29 constitute a storage medium for these pulses, accumulating the pulses one by one until all of them have been received. After all of the pulses have been received, the combined states of conduction of the flip-flops 29 are indicative of the voltage on the lead 2 and the binary coded voltages appearing on leads 30 and 31 may be gated through gates 33 and 36 to the diode matrix 35 for decoding. The lead 38 applies "write" pulses to all of the gates 33 and 36 in parallel, at the instant that the pulse appearing on lead 17 is gated to the flip-flop 29. At this instant, the coincidence gates 33 and 36 are opened and a pattern of voltages appear on the leads 34 and 37 indicative of the coded voltage pulses appearing on leads 10 through 17. In the event that the flip-flop 29, connected to the lead 17, cannot change its state of conduction sufficiently rapidly to have responded to the code pulse during the interval that a voltage pulse appears on the lead 26, A delay line may be inserted in the lead 38 of sufficient delay time to permit operation of the lowermost flip-flop 29, as seen in Figure 1, prior to application of the gating voltage to the coincidence gates 33 and 36.

The diode matrix 35 constitutes a decoding circuit for selecting one of a plurality of leads 28, in this instance, one of 256 leads, in accordance with the binary-coded voltages appearing on the leads 34 and 37. Each ouput lead 28 from the converter 27 is connected to a different combination of horizontal leads 34 and 37 through crystal diodes or other suitable diodes 39. The operation of the diode matrix is conventional and well known in the art and is described only briefly below. Each of the output leads 28 is designated by a number in Figure 1, indicative of its weighted position in the combination of output leads. The lead 28 bearing the numeral 0 is coupled through diodes 39 to each of the horizontal leads 37. Thus, when all of the flip-flops 29 are in the A state of conduction indicating a zero voltage, the zero lead 28 has a current applied thereto. The lead 28 indicated by a numeral 1 is connected through a crystal diode 39 to the lead 34 associated with the lowermost flip-flop 29 and through diodes 39 to the leads 37 of the remainder of the flip-flops 29. Thus upon the receipt by the flip-flops 29 of a count of one, the lead 28 bearing this indication is energized. This pattern of interconnections is followed for all the leads 0 to 255, the 256th lead being connected through the crystal diodes 37 to all of the leads 34. Thus, when all of the flip-flops 28 are in the B state of conduction, indicating a count of 255, the lead 28 bearing this number indication is energized or has current applied thereto.

Each of the leads 28 is connected to a different stylus of a plurality of styli 40. The styli 40 are adapted to record on a record medium 41 which, for purposes of illustration only, may be Teledeltos paper. It is a known property of Teledeltos paper that a dark area is produced thereon in response to the passage of current through the paper. Upon the selection of its associated output lead 28 by the converter 27, one of the styli 40 pass a current through the Teledeltos paper 41 and produces an indication. The styli 40 are arranged in a column perpendicular to the direction of travel of the Teledeltos paper 41, the position of each stylus, with respect to each of the other styli in the column, determining the relative value of its mark on the recording medium. The stylus 40 connected to the lead 28 indicated by the numeral 0 is illustrated as the uppermost stylus in the column in Figure 1; the stylus 40 associated with the lead 28 bearing the numeral indication 255 is positioned as the lowermost stylus in the column, and each of the intermediary styli 40 are connected to output leads 28 adapted to be energized by pulse code groups indicating an analog voltage whose value is equal to the value indicated by the position of the stylus 40 in the column of styli. The graph on the Teledeltos paper 41 in Figure 1 is actually upside down, since the stylus 40 producing a zero indication is illustrated as the uppermost styli to simplify the wiring diagram.

Proceeding with a discussion of the operation of the system of the present invention, the analog voltage appearing on the lead 2 is gated by a pulse appearing on the lead 5 through the coincidence gate 3 to the analog-to-binary converter 4. At the same instant that the information is gated to the converter 4, the flip-flops 29 are reset to the A state of conduction by a voltage pulse appearing on the lead 32 connected to the lead 5. The analog voltage gated to the analog-to-binary converter 4 is converted to a serial binary code, the arrangement of voltage pulses within the serial code being indicative of the voltage appearing on the lead 2. The serially coded pulses appearing on the output lead 8 of the converter 4 are applied to the serio-parallel converter 9 and are distributed timewise to the leads 10 through 17, the pulse having the greatest weight in the binary code appearing on the lead 10 and the pulse appearing on the lead 17 having the least weight in the code. The pulses appearing on the leads 10—17 determine the states of conduction of the flip-flops 29, which store the information contained in a complete pulse group. Upon the appearance of a pulse on the lead 26 the binary coded ouput voltages of the flip-flops 29, appearing on leads 30 and 31, are gated through the coincidence gates 33 and 36 to the horizontal leads 34 and 37 of the diode matrix 35. One and only one output lead 28 is selected by the matrix, the selected lead passing a current through its associated styli 40 and the Teledeltos paper 41 to produce an indication on the paper. The mark produced on the paper has a predetermined position with respect to the other marks appearing thereon, such that it is indicative of the voltage value represented by the binary pulse code representation.

Inasmuch as each mark on the record medium 41 is a discreet indication, the value of the indication is readily determinable by an individual interpreting the record. Consequently, the system of the present invention eliminates human errors introduced in data reduction. The elimination of moving parts provides a system having no under-shoot or over-shoot and, therefore, the overall accuracy of the system is determined wholly by the number of pulses per pulse code representation generated by the analog-to-binary converter 4. If an eight bit serio-binary code is utilized, as illustrated in the circuits of the accompanying drawings, the binary code defines the amplitude of the input to the serio-parallel converter 9 to an accuracy of ±0.2%. The remainder of the circuit, comprising the serio-parallel converter 9 and binary-to-analog position converter 27 employ digital techniques and, consequently, are responsive only to the pattern of pulses appearing on the output lead 8 from the converter 4, and introduce no inaccuracy into the system. Consequently, the accuracy of the system is determined by the number of pulses per binary code utilized in the system and if a higher degree of accuracy is desired, a more extensive pulse code representation may be utilized. However, it must be noted that an increase in the number of pulses per code representation decreases the analog voltage sampling rate of the system. In the embodiment of the invention described above the sampling rate is 24 kilocycles, based upon utilization of a 216 kc./sec. oscillator 7 and a nine stage ring counter 6. The number of stages of the counter is determined by the number of pulses per code representation and if the number of stages is increased the sampling rate is decreased. Since the response of the system is not limited by the inertia of moving parts, the sampling rate determines the system's frequency response. Inasmuch as the sampling rate is effected by the number of pulses per code representation and vice versa, these two interrelated factors must be determined upon a consideration of the accuracy desired and the frequency response required by the nature of the phenomenon under investigation. Although the system is described as utilizing a 216 kilocycle oscillator, it is not restricted to this rate. If the aforementioned Smith analog-to-binary converter is utilized, the analog information appearing on the lead 2 may be converted to binary coded representations of this information in approximately eight microseconds and the serio-parallel converter 9 may distribute the pulses to the leads 10 through 17 in approximately the same eight microsecond interval. Consequently, the utilization of such a converter may allow the number of pulses per code group and, therefore, the accuracy of the system to be increased while maintaining the sampling rate constant or may allow an increase of the sampling rate to 100 kilocycles, while maintaining accuracy at the same value.

The embodiment of the invention illustrated in Figure 1 is adapted to record the analog information developed by a single source 1 of analog information. In a second embodiment of the invention, illustrated in Figure 2 of the accompanying drawings, the recording apparatus of the present invention is adapted sequentially and successively to record the analog voltages developed by a plurality of sources 1; illustrated for the purposes of example only as three distinct sources.

Elements appearing in both Figures 1 and 2 are designated by the same reference numerals and where several elements are utilized in Figure 2 in place of a single element of Figure 1, the same reference numeral is employed followed by a prime. This reference numeral system is also employed in Figures 3 and 4. Each source 1′ of analog voltage is coupled over a lead 2′, respectively, to three coincidence gates 3′, the voltages gated through the gates 3′ being applied in parallel to the analog-to-binary converter 4. The gating voltage pulses generated by the first stage of the ring counter in the pulse distribution generator 6 and appearing on the lead 5 are applied to a three stage ring counter 42, the stages of which are adapted to apply gating voltages to the leads 43, 44 and 45, respectively, each of the leads 43 through 45 applying gating voltage to a different one of the coincidence gates 3'. Except for the provision of three sources 1' of analog information, three coincidence gates 3', ring counter 42 and leads 43, 44 and 45, the system illustrated in Figure 2 is identical with the system illustrated in Figure 1 of the accompanying drawings. At a beginning of a cycle of operation, a first gating voltage pulse appearing on the lead 5 cycles the ring counter 42 so that its first stage is conductive. The first stage of the ring counter 42 applies a gating voltage to the lead 43 and analog information appearing on the lead 2' associated with the uppermost source 1' is gated to the analog-to-binary converter 4. The information appearing on the output lead 8 of the converter 4 is distributed by means of the serio-parallel converter 9 to the leads 10 through 17 and to the flip-flops 29 of the binary-to-analog position converter 27. Upon the application of a writing pulse over the lead 38 to the binary-to-analog position converter 27, a single mark is recorded on the recording medium 41 indicative of the analog voltage generated by the uppermost voltage source 1'. Upon the application of a second gating voltage pulse to the lead 5, the ring counter 42 is stepped to its second stage and a gating pulse appears on the lead 44. A gating pulse on the lead 44 gates the voltage appearing on the lead 2' associated with the intermediate source 1' to the analog-to-binary converter 4 and subsequently, a single mark is applied to the recording medium 41 indicative of the instantaneous amplitude of the voltage generated by the intermediate source 1'. The third gating pulse on the lead 5 results in the application of a gating voltage to the lead 45 and an indication is applied to the record medium 41 indicative of the amplitude of the analog voltage generated by the lowermost source 1'.

The application of a fourth pulse to the lead 5 cycles the ring counter 42 to its first stage and a pulse again appears on the lead 43 and the cyclic operation is repeated. It can be seen from the above that the analog graphs on the record medium 41 relating to the three sources 1' are interleaved; that is, a mark indicative of the instantaneous voltage from one of the sources 1' is recorded and, thereafter, sequentially and successively marks indicative of the voltages generated by the other two sources 1' are recorded. The interleaving of the various graphs of the voltages produced by the sources 1', is an acceptable practice where the number of distinct sources is small, such as three, as in the embodiment of the invention illustrated in Figure 2. Where large numbers of sources 1' are to be sequentially and successively interrogated, the practice of interleaving the graphs may result in confusing and non-distinguishable records, and consequently, it may be desirable under these circumstances to provide separate graphs indicative of the information supplied by each of the sources 1'.

An embodiment of the invention wherein the analog voltage produced by each of the sources 1' is recorded on a distinct record medium is illustrated in Figure 3 of the accompanying drawings. The analog voltages developed by the sources 1' on the leads 2' are gated through the coincidence gate 3' by the voltages developed on the leads 43, 44 and 45 by the ring counter 42. The voltages sequentially and successively gated through the coincidence gates 3' are applied to the analog-to-binary converter 4 which develops pulse code representations of the analog voltages being investigated on the lead 8 and via the lead 8 are applied to the serio-parallel converter 9. The pulse distribution generator 6 sequentially and successively applies gating voltages to the leads 19 through 26 to effect distribution of the voltage pulses of each pulse coded representation to the leads 10 through 17. To this point, the circuits of Figures 2 and 3 are identical and the same reference numerals are employed to identify corresponding elements in the two figures. Each of the leads 10 through 17 is applied in parallel to three gate circuits 45, each gate circuit 45 containing eight coincidence gates and each of the leads 10 through 17 being connected to distinct coincidence gates in each of the gate circuits 45. Each of the gate circuits 45 provides a group of eight output leads 10' through 17', each group of output leads being connected to a distinct binary-to-analog position converter 27. Gating pulses are sequentially and successively developed on leads 46, 47 and 48 by a ring counter 49 comprising three counting stages, the leads 46 to 48 being connected respectively to the gating circuits 45 to effect sequential and successive gating of pulses on leads 10 to 17 to the leads 10' through 17'. The counter 49 is stepped by pulses developed on a lead 50 connected to the lead 5. Consequently, the stepping pulses applied to the ring counters 42 and 49 are developed on the common lead 5, thereby to synchronize the operation of the two ring counters. Upon the application of a voltage pulse to the lead 43 to gate information from the upper analog source 1' to the converter 4, the ring counter 49 develops a voltage on the lead 46 to gate the information on the leads 10 through 17 through an upper recording channel including the upper gate circuit 45 and binary-to-analog position converter 27'. Subsequent pulses appearing on the lead 5 gate the information from the intermediate and lowermost analog voltage sources 1' to the converter 4 and through the intermediary and lowermost gates 45, respectively, to the intermediate and lowermost binary-to-analog position converter 27'. The "write" pulses appearing on the lead 38 are coupled in parallel to each of the binary-to-analog position converters 27', the two unselected converters 27' providing zero indications on their associated record media 41' while the selected binary-to-analog position converter 27' applies a mark to its record media 41' indicative of the analog voltage appearing on the lead 2' of its associated voltage source 1'. Thus, the graphs recorded on the distinct record media 41 consist of a zero line having equally spaced repetitive deviations from zero, the spacing between the deviations being determined by the repetition rate of the system which has been chosen as 24 kilocycles per second for the purpose of description only.

The system utilized in the embodiment of Figure 3 for energizing three distinct sets of styli 40 requires the employment of three binary-to-analog position converters 27'. Inasmuch as each converter 27' utilizes a diode matrix having 256X8 crystal diodes, it is desirable to maintain the number of binary-to-analog position converters at a minimum. In a preferred arrangement of the present invention illustrated in Figure 4, selection of the sets of styli 40' is determined by switching circuits in the output of a single binary-to-analog position converter 27. Although 256 coincidence gates, utilizing two crystals per gate in a conventional gate circuit, must be employed for selecting each group of styli 40', the number of crystal diodes involved is still considerably less than the number required if separate binary-to-analog position converters 27' are to be employed for each channel of information.

Referring specifically to the embodiment of the invention illustrated in Figure 4 of the accompanying drawings, the analog voltages to be recorded and appearing on leads 2' are sequentially and successively gated through the coincidence gate 3' to the analog-to-binary converter 4 by means of the voltage pulses appearing on the leads 43, 44 and 45. The binary coded voltage pulses appearing on the lead 8 are applied to the serio-parallel converter 9 and gated to the output leads 10 through 17 by means of voltage pulses appearing on the leads 19 through 26. The distributed pulses appearing on the leads 10 through 17 are applied to the binary-to-analog position converter 27, which selectively applies a voltage pulse to one of its output leads 28 in accordance with the code representation applied to the leads 10 through 17. Each of the output leads 28 is connected in parallel to one coincidence gate in each of three distinct gating circuits 51, there being one gating circuit for each channel of information to be gated, and 256 coincidence gates per gating circuit 51. Each gating circuit has 256 output leads 28', each lead from each gating circuit 51 being connected to a distinct recording styli 40' and each group of styli 40' being associated with a distinct recording medium 41'. The voltages appearing on the output leads 28 of the analog-to-binary converter 27 are gated to the leads 28' by gating voltage pulses appearing on leads 52, 53 and 54 and each of the leads 52, 53 and 54 is connected in parallel to all of the coincidence gates of a distinct gating circuit 51. Thus the lead 52 is adapted to apply gating voltage pulses to all of the coincidence gates in the uppermost gating circuit 51 and the pulses appearing on the leads 53 and 54 are applied, respectively, to the intermediate and lowermost gating circuits 51. The gating voltage pulses appearing on the leads 52 through 54 are developed by a ring counter 55 which is stepped by voltage pulses appearing on the lead 38, the lead 38 being connected to the lead 26 constituting one of the output leads of the distribution generator 6. The ring counters 42 and 55 coact to determine the group of styli 40' to be utilized to record the information from a particular source 1'. The ring counter 55 is stepped once each cycle of operation of the generator 6, as is the counter 42, but at a different time as determined by the number of leads 19 through 26. For example, when the ring counter 42 applies a gating pulse to the lead 43 to gate information from the uppermost analog voltage source 1' to the converter 4 the subsequent appearance of a voltage pulse on the lead 26 steps the ring counter 55 so that it applies a pulse to the lead 52 to gate information through the uppermost gating circuit 51 to the uppermost group of styli 40'. Inasmuch as the gating circuits 51 are connected in the output leads 28 of the converter 27 they prevent the application of voltages to the styli 41' until a pulse appears on one of the leads 51 to 54 and, consequently, serve as write gates for the system.

Various other arrangements than those illustrated in Figures 3 and 4 may be provided for gating the information indicative of a particular channel to a particular set of recording styli 40'. However, the embodiment of the invention illustrated in Figure 4 is the most economical in that it utilizes the least number of circuit components.

It can be seen from the above description that the utilization of analog-to-digital conversion in the analog-to-binary-to-analog position recording system of the present invention provides a high speed recording system which produces an accurate and accurately readable analog record. The system has no moving parts and, consequently, the frequency response of the system is not limited by inertia of moving parts and accuracy is not effected by over-shoot and under-shoot or vibration, shock and acceleration. The accuracy of the system is determined by a single element, the analog-to-binary converter 4, the remainder of the elements operating on digitalized voltage pulses and, therefore, having no effect on system accuracy. The sampling rate and, therefore, frequency response of the system is determined primarily by the time required by the analog-to-binary converter 4 to convert analog information to a binary code, and this time interval may be maintianed quite small. In a system in accordance with the present invention wherein information from a single analog voltage source is to be recorded, samples of the voltages may be taken at between 24 to 100 kilocycles per second or higher, and therefore, the system can record a distinct voltage magnitude every 40 to 10 microseconds. In the systems as illustrated in Figures 2 through 4 wherein information indicative of the condition of a plurality of voltage sources are sequentially and successively recorded, the repetition rate of the system may be between 24 to 100 kilocycles per second divided by the number of channels to be recorded. In one specific system in which the apparatus of the present invention has been utilized, the information from 32 distinct analog voltage has been recorded with very little loss in detail of the information to be recorded. The basic operating rate of the circuit may be varied considerably and it is not intended to limit the invention to specific repetition rate. By utilizing techniques well known in the art, the operating rate of the flip-flops in the binary-to-analog position converter 27 and the operation of the various crystal diode coincidence gates utilized throughout the system may be increased and the repetition rate correspondingly increased.

Although the apparatus of the present invention has been determined as utilizing ring counters, it may be preferable to employ broken ring counters in place thereof. Broken ring counters provide an additional safety feature in that they are positively reset at the end of each counting cycle and, therefore, if a counter drops out of synchronism during a counting cycle, it is resynchronized at the end of the cycle.

While I have described and illustrated several specific embodiments of the present invention, it will be clear that other variations of the specific details of construction may be resorted to without departing from the true spirit of the invention as defined in the appended claims.

What I claim is:

1. A system for recording analog information comprising means for converting an analog voltage to a pulse code representation of the analog voltage, a plurality of recording means each for recording an indicia on a record medium in response to the application of a recording voltage thereto, said recording means being arranged such that the position of each recording means with respect to the position of the others of said recording means determines the relative value of its indicia on the recording medium and decoding means for decoding the pulse code representation produced by said means for converting and applying a recording voltage to the one of said recording means having a position indicative of the quantity represented by said pulse code representation.

2. A system for recording analog information comprising means for sequentially and successively converting the instantaneous magnitudes of an analog voltage to pulse code representations thereof, a plurality of marking members arranged in at least one row transverse to the direction of movement of a record medium, each of said marking members being adapted to respond to an energizing voltage to mark an adjacent area of the record medium, the positions of each of said marking members with respect to the other of said marking members determining the relative value of its mark on the record medium, and decoding means for sensing each of the pulse code representations and selectively energizing the marking member whose position is representative of the quantity indicated by the pulse code representation.

3. A system for recording analog information comprising means for sequentially and successively generating pulse code representations of the instantaneous magnitudes of an analog voltage, a plurality of voltage responsive means for marking a record medium, the position of each of said voltage responsive means with respect to the other of said voltage responsive means determining the relative value of its mark on the record medium, a decoding means having an input circuit connected to receive the pulse code representations and a plurality of output leads at least equal in number to said voltage responsive means, said decoding means including means for applying a voltage to a different one of said leads in response to each different pulse code representation, and means connecting each of said leads to a different one of said voltage responsive means, the lead selected by a particular pulse code representation being connected to the voltage sensitive means having a position indicative of the magnitude of the analog voltage represented by the pulse code representation.

4. A system for recording analog voltages comprising means for sensing an analog voltage at predetermined successive intervals, means for converting the analog voltage sensed during each interval to a group of binary coded voltage pulses representative of the value of the analog voltage, a plurality of styli for recording on an electro-sensitive recording medium, the position of each of said styli with respect to the other of said styli determining the relative value of its mark on the recording medium, and binary-to-analog position converting means for applying a voltage to the stylus indicative of the value represented by the successive groups of binary coded voltage pulses.

5. A system for recording analog information comprising means for converting an analog voltage to a pulse code representation thereof, gate means for sequentially and successively gating analog voltages from a plurality of sources to said means for converting, a plurality of groups of recording members for marking record mediums, the number of groups of recording members being equal to the number of sources of analog voltages, the position of each recording member with respect to the other of said recording members in its group determining the relative value of its mark on the recording member, a plurality of decoder means each associated with one group of said plurality of groups of recording members for converting the code pulses to analog position voltages, and means synchronized with said gate means for sequentially and successively connecting each decoder means of said plurality of decoder means to an output circuit of said converter means to receive the pulse code representations, each of said decoder means applying a voltage pulse to the recording member of its associated group having a position in the group indicative of the value represented by the pulse code representation.

6. The combination in accordance with claim 5, wherein said means for converting converts an analog voltage to binary coded voltage pulses.

7. The combination in accordance with claim 5, wherein said decoder means converts binary coded voltage pulses to an analog-position voltage.

8. A system for recording analog information, comprising means for converting an analog voltage to a pulse code representation thereof, gating means for sequentially and successively gating analog voltages from a plurality of sources to said means for converting, a plurality of groups of recording members for marking a record medium the position of each recording member with respect to the other of said recording members in its group determining the relative value of its mark on the recording member, a plurality of leads equal in number to the number of recording members in each of said groups of recording members, means synchronized with said gating means for sequentially and successively connecting said leads to said groups of recording members and decoder means for converting said pulse code representation to a voltage on the one of said leads connected to the recording member having a position in a group of recording members indicative of the value represented by the pulse code representation.

9. A system for recording analog information, comprising means for converting an analog voltage to a pulse code representation thereof, gating means for sequentially and successively gating analog voltages from a plurality of sources to said means for converting, a plurality of groups of recording members for marking a record medium, the position of each recording member with respect to the other of said recording members in its group determining the relative value of its mark on the recording member, a plurality of decoding means each for sensing the pulse code representations and selectively energizing the recording members in its associated group of recording members and means synchronized with said gating means for sequentially and successively connecting each decoding means of said plurality of decoding means with an output circuit of said means for converting to receive said pulse code representation.

10. A system for recording analog information, comprising means for converting an analog voltage to a pulse code representation thereof, gating means for sequentially and successively gating analog voltages from a plurality of sources to said means for converting, a plurality of recording members for marking a record member, the position of each recording member with respect to the position of the other of said recording members determining the relative value of its mark on the recording medium and decoder means for converting said pulse code representation to energize the one of said recording members having a position indicative of the value represented by the pulse code representation.

11. The combination in accordance with claim 3 wherein said decoding means includes a diode matrix for selecting said leads and a plurality of bi-stable elements for energizing said diode matrix, and means including a serio-parallel converter for applying each element of the pulse code representation to a distinct bi-stable element.

References Cited in the file of this patent

UNITED STATES PATENTS

| | | |
|---|---|---|
| 2,566,078 | Bliss | Aug. 28, 1951 |
| 2,571,680 | Carbrey | Oct. 16, 1951 |
| 2,639,209 | Gamarekian | May 19, 1953 |
| 2,643,172 | Reiss | June 23, 1953 |
| 2,686,299 | Eckert | Aug. 10, 1954 |
| 2,706,215 | Van Duuren | Aug. 12, 1955 |
| 2,715,678 | Barney | Aug. 16, 1955 |
| 2,769,680 | Beck | Nov. 6, 1956 |
| 2,779,654 | Williamson | Jan. 29, 1957 |
| 2,791,746 | Bowersox et al. | May 7, 1957 |
| 2,796,314 | Bishop | June 18, 1957 |
| 2,830,759 | Hudes et al. | Apr. 15, 1958 |

OTHER REFERENCES

Publication, IRE Professional Group on the Instrumentation PGI #2 June 1953.